US008253516B2

(12) United States Patent
Miller, II et al.

(10) Patent No.: US 8,253,516 B2
(45) Date of Patent: Aug. 28, 2012

(54) USING AN ELECTRIC POWER CABLE AS THE VEHICLE FOR COMMUNICATING AN INFORMATION-BEARING SIGNAL THROUGH A BARRIER

(75) Inventors: Robert R. Miller, II, Convent Station, NJ (US); Harry R. Worstell, Florham Park, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 224 days.

(21) Appl. No.: 12/653,165

(22) Filed: Dec. 8, 2009

(65) Prior Publication Data

US 2011/0136432 A1 Jun. 9, 2011

(51) Int. Cl.
*H01P 3/00* (2006.01)
*G08B 1/08* (2006.01)

(52) U.S. Cl. .................. 333/240; 333/24 R; 340/538.15

(58) Field of Classification Search ................ 333/24 R, 333/240; 340/538, 538.15, 538.16
See application file for complete search history.

(56) References Cited

U.S. PATENT DOCUMENTS

| | | | | |
|---|---|---|---|---|
| 2,685,068 | A * | 7/1954 | Goubau | 333/240 |
| 6,980,091 | B2 * | 12/2005 | White et al. | 340/5.53 |
| 7,145,440 | B2 * | 12/2006 | Gerszberg et al. | 375/258 |
| 7,280,033 | B2 * | 10/2007 | Berkman et al. | 340/12.37 |
| 7,436,321 | B2 * | 10/2008 | White et al. | 340/870.02 |
| 7,796,025 | B2 * | 9/2010 | Berkman | 340/538.16 |
| 2010/0191487 | A1 * | 7/2010 | Rada et al. | 702/60 |
| 2011/0004357 | A1 * | 1/2011 | Mathiowetz | 700/295 |
| 2011/0132658 | A1 * | 6/2011 | Miller et al. | 174/70 R |
| 2011/0133865 | A1 * | 6/2011 | Miller et al. | 333/24 R |
| 2011/0133867 | A1 * | 6/2011 | Miller et al. | 333/240 |

* cited by examiner

*Primary Examiner* — Dean O Takaoka
(74) *Attorney, Agent, or Firm* — Ronald D. Slusky

(57) ABSTRACT

The RF signal generated by a ZigBee radio on the outside of a building structure is conveyed to the interior of the building by guiding it as a surface wave along an electric cable bundle that passes through the building's wall to supply domestic electric power to the interior of the structure. The RF signal is launched by a unique coupler comprising a pair of insulated foil conductors.

16 Claims, 2 Drawing Sheets

11
16e
16d
39
β
α
19
31
32
33
34
35a
35b
35
16a
16b
16c
TO METERING MODULE 18
FROM ZIGBEE RADIO 17

USING AN ELECTRIC POWER CABLE AS THE VEHICLE FOR COMMUNICATING AN INFORMATION-BEARING SIGNAL THROUGH A BARRIER

BACKGROUND

Arrangements are known for automatic/remote reading of utility meters, and it is known that the so-called "ZigBee" (IEEE standard 802.15.4) wireless network interface has gained favor for such applications. A metering module within the meter box affixed to the outside of the building served by the utility service in question, e.g., electric power, obtains the current utility meter reading (hereinafter "utility meter data") and applies it to a ZigBee radio, which modulates the meter reading onto a carrier signal conforming to the ZigBee wireless networking standard. The carrier signal is transmitted over the air to a neighborhood "aggregator node" and then through wired or cellular backhaul facilities to the utility company.

Concurrent with these developments, there has been an increased interest by utility customers in being able to obtain utility meter data on an ongoing basis in order to monitor electric or other utility usage as part of an energy conservation effort. To this end, one may have a ZigBee, or other wireless network, within the structure to exchange data or commands. This communication can include devices within the structure, such as energy usage/management profile displays, monitoring and/or load control devices and/or a device that could "backhaul" the utility meter data to the utility company via an existing broadband service such as DSL.

SUMMARY OF THE INVENTION

ZigBee signals are low-power radio frequency (RF) signals. Disadvantageously, such signals may not be able to adequately penetrate a building structure to reach wireless receivers inside, particularly when the transmitter is mounted on a building foundation—the composition and thickness of which can present a major impediment to the transmission of the low power signal into the structure, and even more so when the foundation contains reinforcement bars or other metallic elements. This could be overcome by increasing the power output of the transmitter. However, such a power increase might cause the carrier signal to interfere with like signals generated by transmitters at other buildings nearby.

In accordance with the invention, an information-bearing signal is communicated through a foundation wall or other barrier via the electric power bundle, or cable, that passes through the barrier to supply electric power to the interior of the structure. That approach allows a ZigBee or other carrier signal to be extended robustly through a building foundation or other RF signal barrier—on the other side of which it can be received, re-distributed, or repeated—using an existing pathway (viz., the power cable) through the barrier.

In particular embodiments, the present invention may be implemented in conjunction with the invention that is the subject of our U.S. patent application Ser. No. 12/653,175 filed of even date herewith and entitled "Using surface wave propagation to communicate an information-bearing signal through a barrier." That subject matter, broadly speaking, is the notion of using a surface wave propagation mode as the mechanism for communicating an electromagnetic signal through a wall or other barrier along an electromagnetic-wave-guiding path. That patent application further discloses that the surface wave propagation mode may advantageously be so-called "G-Line" or Goubau propagation.

In particular embodiments, the present invention may be implemented in conjunction with the invention that is the subject of our U.S. patent application Ser. No. 12/653,167 filed of even date herewith and entitled "Surface wave coupler" That subject matter is a novel coupler for launching surface waves, such as waves in the G-line propagation mode.

DETAILED DESCRIPTION OF AN ILLUSTRATIVE EMBODIMENT

Figure 1:
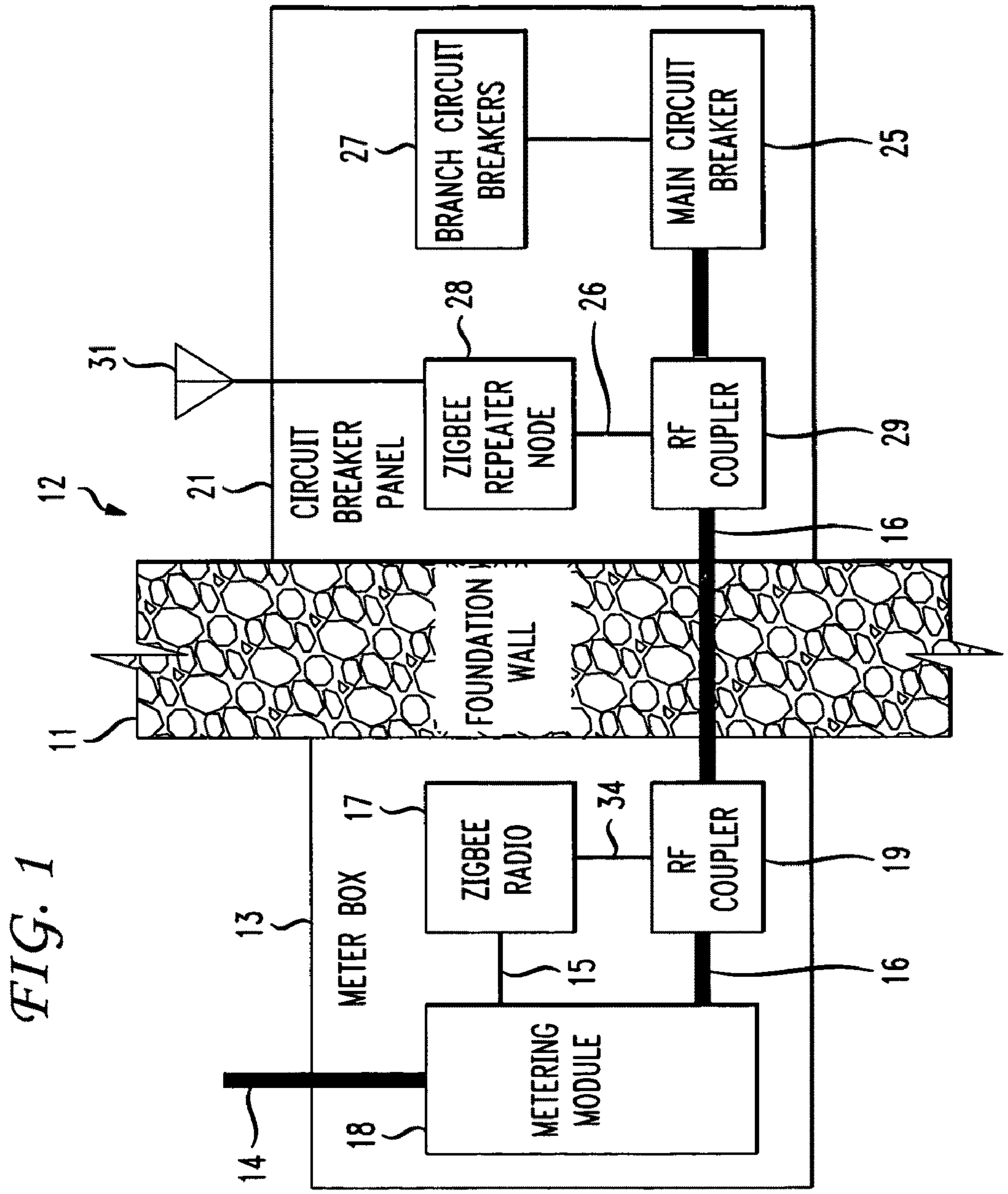
FIG. 1 shows an arrangement embodying the principles of the invention.

FIG. 1 shows a portion of a foundation wall 11 of a building or other structure, having an interior area denoted as 12. Attached to the exterior side of foundation wall 11 is a meter box 13 into which comes a service entrance cable 14 carrying derives power from, say, a utility pole near the building via a so-called "drop" and a service-entrance cable that terminates at meter box 13. Service entrance cable 14 terminates on a watt-hour meter (not shown) within a metering module 18 which is, in turn, mounted within meter box 13. A service cable 16 connected to (typically) the base of the watt-hour meter extends through foundation wall 11 supplies electrical power to main circuit breaker 25 mounted on circuit breaker panel 21 mounted on the interior side of foundation wall 11. Main circuit breaker 25 supplies power to individual branch circuit breakers 27 which, in turn, supply power to outlets, fixtures and appliances via 15- or 20-ampere circuits comprising 12 AWG or 14 AWG conductors.

Figure 2:
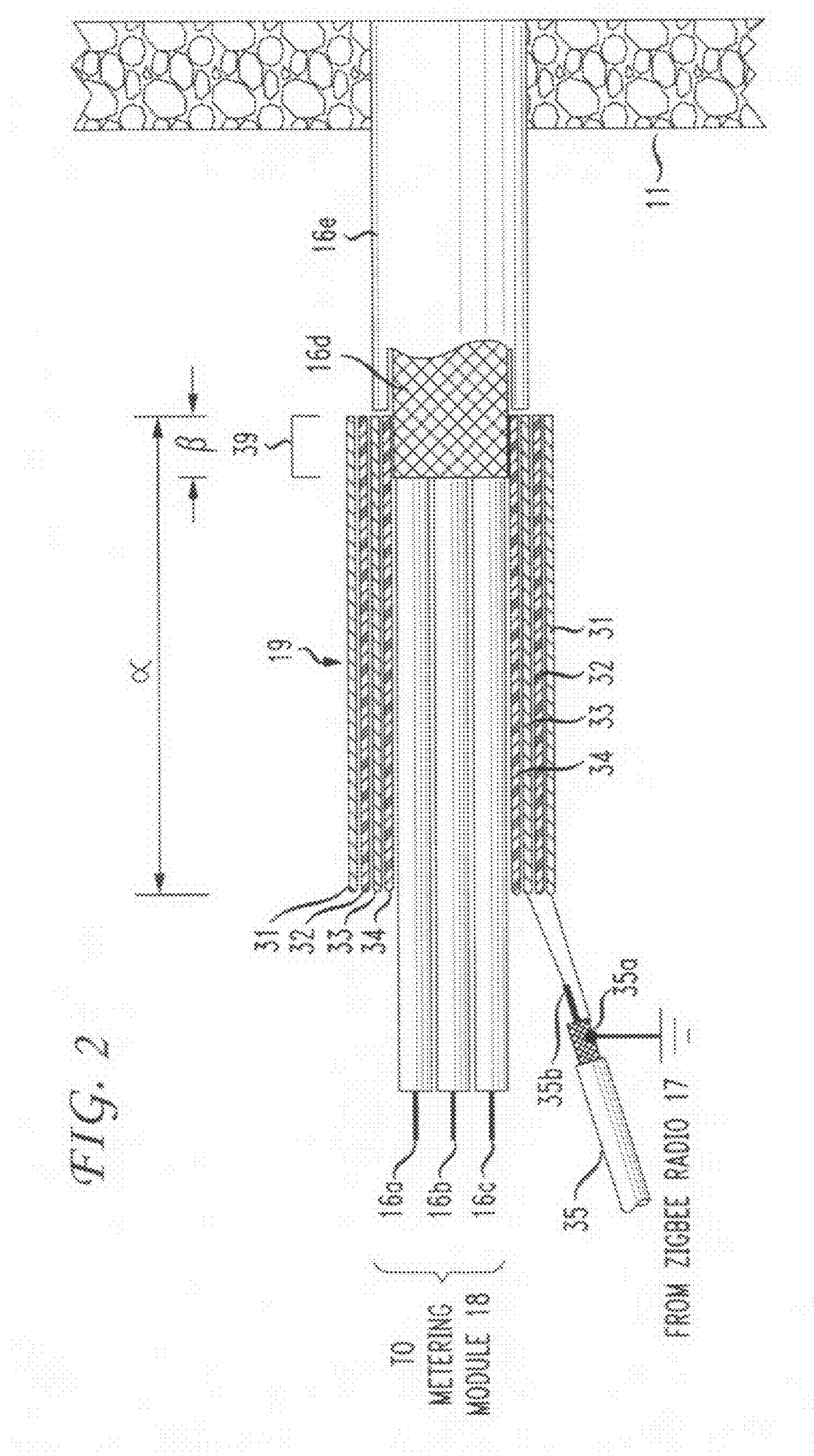
FIG. 2 is a cross-sectional view of a coupler illustratively used in the embodiment of FIG. 1.

Service cable 16 is illustratively a triplex electric power bundle, or cable and is hereinafter referred to as "triplex 16." As seen in FIG. 2, triplex 16 illustratively comprises an insulated neutral conductor 16*b*; insulated "hot" conductors 16*a* and 16*c* carrying standard domestic power at respective ends of the secondary of a distribution transformer (not shown); an outer metal mesh shield 16*d* surrounding conductors 16*a*, 16*b* and 16*c*; and triplex insulation 16*e* surrounding shield 16*d*. The latter is earth-grounded at both meter box 13 and circuit-breaker panel 21.

The term "domestic power" as used herein means AC power as delivered for use within homes and businesses. Such "domestic power" is delivered in North America, for example, on each of two phases at a nominal voltage of 120 volts AC and a frequency of 60 Hz, and in other places at a nominal voltage of 230 volts AC and a frequency of 50 Hz. Triplex 16 is a cable having a National Electric Code (NEC) current rating of at least 100 amperes, that rating being a typical minimum service allowed by building codes for residential structures. And in accordance with NEC standards, the conductors of triplex 16 comprise at least one a) copper conductor of size 4 AWG or larger or b) aluminum conductor of size 2 AWG or larger, these being conductor sizes that are specified in NEC Table 310.15(B)(6) for service cables. More generally, triplex 16 will, in illustrative embodiments, be of a cable type that meets NEC requirements, and/or is approved by Underwriters Laboratories, for cable that connects equipment mounted on or at the outside of a structure (e.g. a watt-hour meter) to equipment mounted on or at the inside of the structure (e.g. a circuit breaker). Metering module 18 supplies an information-bearing signal—in this case a signal carrying electric power meter reading data—to ZigBee radio 17 within the meter box via lead 15. ZigBee radio 17 generates an RF signal conforming to IEEE standard 802.15.4 (hereinafter "ZigBee RF signal") that carries the utility meter data.

In prior art practice, the ZigBee RF signal would be applied to an antenna that would communicate the signal through the air to the relevant utility company or to a radio link aggregator hub and thence over another network to the utility company. In this embodiment, however, the ZigBee RF signal is communicated via a coaxial cable (hereinafter "Zigbee cable") 35 through foundation wall 11 via an electromagnetic-wave-guiding path, pursuant to the principles of the invention that is the subject of our U.S. patent application Ser. No. 12/653,166 filed of even date herewith and entitled "Technique for Conveying a Wireless-Standard Signal Through a Barrier."

In accordance with the present invention, the electromagnetic-wave-guiding path is the electric power bundle, or cable, that passes through foundation wall 11 to supply electric power to interior 12. That approach allows a ZigBee or other carrier signal to be extended robustly through a building foundation or other RF signal barrier—on the other side of which it can be received, re-distributed, or repeated—using an existing pathway through the foundation wall which, in this case, is triplex 16—a pathway through the barrier that, because it must be there anyway, can advantageously be used for this additional purpose.

It is known in the art to communicate data on a carrier signal using electric power wires. Such Power Line Communication, or PLC, systems (also sometimes referred to as Power Line Carrier systems) use some form of high-pass filter to physically connect the cable carrying the carrier signal to the power wire conductor. Such an approach could, if desired, be used for the present system. However, isolating domestic power from the components generating the carrier signal requires relatively bulky and relatively expensive components.

As an advantageous alternative, the herein-disclosed embodiment of the present invention takes advantage of the invention that is the subject of our above-noted patent application entitled "Using surface wave propagation electric power cable to communicate an information-bearing signal through a barrier." In particular, the ZigBee carrier signal of the present embodiment is communicated via the triplex not by being connected directly to the triplex's electric wire conductor(s). Rather, at least a substantial portion of the signal is launched as a surface wave within the interior of the triplex and, in particular embodiments, as a guided surface wave mode called the "G-Line" or Goubau mode in which electromagnetic waves are transmitted via a transverse-magnetic surface wave propagation—a mechanism that requires, at a minimum, only a single conductor. See, for example, the following U.S. Pat. Nos., which are hereby incorporated by reference: U.S. Pat. Nos. 3,201,724 and 7,567,154. Instead of propagating the signals over long-distances on high voltage wires, which is the typical prior art application of G-line propagation, we are illustratively using G-line propagation to propagate signals over short distances, e.g. typically 10 feet or less, through building (or other) walls over wires carrying power at domestic power voltage levels.

More specifically, triplex 16 serves as an RF signal "guide". The phase conductors 16*a*, 16*b* and 16*c* as a group act as the "center conductor" of what is effectively a coaxial cable ("coax"), and mesh shield ("wound ground") 16*d* acts as the "shield" of the coax. The electromagnetic wave propagates through the dielectric region comprising the phase conductor insulation, cable filler material, and air. Goubau propagation depends upon surface wave propagation along a "boundary layer" between a conductor and a dielectric. The discontinuity between those two causes the electromagnetic wave to propagate at slightly lower speed at the surface of the conductor than within the dielectric, causing the wavefront propagation direction to bend slightly toward the conductor where it "hugs" the wire, remaining "guided," even without an explicit shield. Conventional coaxial cables are usually designed to have a geometry that discourages non-TEM modes, such as G-line, but the diameter of the triplex is so large compared to a wavelength at ZigBee frequencies, for example, that the propagation supports a mixture of modes common in coaxial cables and the "G-line" mode.

Typically, RF energy is introduced onto "G-Lines" using a launching "horn" or other impedance-matching architecture that transitions a coaxial cable of conventional diameter into a very large one where the "shield" has moved toward infinity. In the present embodiment, by contrast, the matching function is advantageously accommodated by a novel layered coupler that is the subject of our above-noted patent application entitled "Surface wave coupler."

The detailed structure of such a coupler 19 is shown in FIG. 2, as described below. It suffices the present to note that coupler 19 causes the ZigBee RF signal to be launched as an electromagnetic wave guided within the aforementioned dielectric region of triplex 16—thereby propagating the ZigBee RF signal through foundation wall 11 to the interior of the building and, in this particular embodiment, to circuit breaker panel 21 mounted on the interior side of foundation wall 11. The structure of coupler 19 is such as to launch an electromagnetic signal having a significant G-line-mode component, as well as possibly various other transverse electromagnetic, or "TEM," modes and other, degenerative, modes.

A coupler 29, which is substantially identical to coupler 19, couples the ZigBee RF signal from its propagation path, via a coaxial cable 26, to a ZigBee repeater node, or transceiver, 28 illustratively mounted on circuit breaker panel 21. Couplers 19 and 29 are relatively close to one another—typically no more than ten feet apart.

An illustrative method for providing an installation of the type shown in the FIGS could include installing coupler 19 on the outside of triplex 16 at the exterior side of wall 11, connecting the signal output of ZigBee radio 17 to coupler 19, installing coupler 29 on the outside of triplex 16 at the interior side of wall 11, and interconnecting a signal input of repeater node 28 with coupler 29. These steps need not be performed in the order stated; any convenient order can be used. In fact, the meter box manufacturer or supplier could pre-install coupler 19 on a pre-installed portion of service cable 16 within the meter box with coupler 29 being left for installation by the building owner or other installer. Moreover, the meter box as supplied to the installer might already include ZigBee transmitter 17 which might already be connected to the coupler 19. Similarly, the manufacturer or supplier of the circuit breaker panel might pre-connect coupler 29 thereto, or might at least supply repeater node 28 and coupler 29 packaged together. Another possibility is for a manufacturer to supply an electrical component comprising a portion of service cable 16 onto which coupler 19 or coupler 29 has already been installed (i.e. an article of commerce comprising a length of cable and coupler as depicted in FIG. 2 described in detail below.)

In the disclosed embodiment, transceiver 28 is a repeater node that re-broadcasts the ZigBee signal to devices within the structure via antenna 31. ZigBee-capable devices within the structure can thereupon extract the utility meter data carried on the ZigBee RF signal and use that data for energy usage monitoring and/or load control, and/or to "backhaul" the utility meter data to the utility company over an existing internet, e.g. DSL, connection. In other embodiments, the monitoring devices might be hard-wired to the transceiver. In yet other embodiments, receiver 28 may extract the meter information from the ZigBee RF signal and transmit the meter information within the structure using a different wired or wireless transmission format, such the IEEE 802.11 (WiFi) standard.

FIG. 2 shows an illustrative implementation of coupler 19. Coupler 19 illustratively comprises four layers—an innermost insulation layer 34, an "inner" metal foil conductor 33 surrounding layer 34, another insulation layer 32 and another, "outer" metal foil conductor 31. The two foil conductor layers may be, for example, of copper and the insulation layers may be, for example, of Mylar® or other material exhibiting high dielectric strength. Inner conductor 33 is connected to the center conductor 35*b* of ZigBee cable 35 and outer conductor 31 is connected to the shield 35*a* of the ZigBee cable 35. A nominal thickness for conductors 31 and 33 is 0.010 inches (10 mils) and the Mylar insulation is preferably at least 0.001 (1 mil) thick.

The end of conductor 33 further from wall 11—the left-hand end from the perspective of FIG. 2—is connected to the central conductor 35*b* of Zigbee cable 35. The other end of conductor 33—the right-hand end from the perspective of FIG. 2—is left open. Conductor 31 further from wall 11 is connected to ground along with shield 35*a* of Zigbee cable 35.

Coupler 29 is substantially similar to coupler 19 except that cable 26 is connected on the right-hand side (as viewed in the FIGS) of coupler 29—that is on the respective sides of coupler 29's conductive foil layers that are furthest from the building-interior side of wall 11. The inner and outer foil conductors of coupler 29 are connected to the central conductor and shield, respectively, (not shown) of cable 26.

Coupler 19 is wound around the triplex cable conductor wires 16*a*, 16*b* and 16*c* in such a way that most of the coupler's surface covers the conductor wires with but a slight overlap onto shield 16*d* in an overlap region 39. That is, as seen in the FIG., respective portions of insulation 16*e* and shield 16*d* have been removed going back to metering module 18 (toward the left from the perspective of FIG. 2) so that most of coupler 19 surrounds conductors 16*a*, 16*b* and 16*c* without there being any intervening portion of insulation 16*e* or shield 16*d*. As shown in FIG. 2, triplex insulation 16*e* may also be removed in overlap region 39, but this is optional. A typical length a of coupler 19 could be about 3.0 inches—which is about ½ wave length @2.45 GHz—and the length β of the region of overlap 39 could be about 0.5 inches.

Coupler 19 can be understood as being a corrupted version of a conventional coaxial cable such as Zigbee cable 35 that conducts RF energy from ZigBee radio 17 to the coupler itself. Specifically, conductor 31 acts as a shield for conductor 33, thereby ensuring that the ZigBee radio frequency signal is impressed within the triplex rather than radiating like an antenna.

With the center conductor 35*b* of Zigbee cable 35 terminating on inner conductor 33, an electric field is established between inner conductor 33 of the coupler and phase conductors 16*a*, 16*b* and 16*c* of the triplex—i.e. within the dielectric region consisting of the triplex phase conductor insulation, filler material and air—thus effectively being a capacitor structure having conductor 33 as one plate of the capacitor and conductors 16*a*, 16*b* and 16*c* jointly serving as the other plate of the capacitor.

Coupler 19 launches an electromagnetic field between the aggregated triplex conductors 16*a*, 16*b* and 16*c* and its shield conductor 16*d* which together form an electromagnetic-signal-guiding path in the nature of an imperfect coaxial cable serving as a waveguide to guide the Zigbee signal along the interior of triplex 16.

At the interior-end of the triplex, within interior area 12, coupler 29 converts the electromagnetic field into metallic RF voltage that can be used by the repeater node 28 for detection or transmission in the other direction.

The foregoing merely illustrates the principles of the invention and numerous alternatives are possible, some of which will now be mentioned:

The invention is illustrated in the context of a system employing the ZigBee wireless standard—IEEE 802.15.4. (The IEEE 802.15.4 standard is hereby incorporated by reference as though fully set forth herein.) However, any presently known or future-developed wireless air interface might be used for the information-bearing signal.

Moreover, the invention is illustrated in the context of the conveyance of utility meter information. However, other types of data might be conveyed through a barrier using the technique of the present invention.

It will thus be appreciated that those skilled in the art will be able to implement the principles of the invention using various alternative arrangements not explicitly shown or described herein while still being within the invention's spirit and scope.

The invention claimed is:

1. A method for communicating an electromagnetic signal from a first side of a building wall to a second side of the building wall, there being a cable that passes through the building wall, the method comprising launching the electromagnetic signal in such a way that it includes a substantial surface wave mode that propagates along the path of said cable that passes through the building wall.

2. The method of claim 1 wherein the cable is an electric power cable conveying domestic power through the building wall.

3. The method of claim 1 wherein the surface wave mode is Goubau propagation.

4. The method of claim 1 wherein the first side of the building wall is an exterior side of the building wall, wherein the second side of the building wall is an interior side of the building wall, and wherein the method further comprises coupling the electromagnetic signal from the cable at the second side of the building wall to a repeater node, said coupling being carried out at a point that is no more than ten feet from where the electromagnetic wave was launched.

5. A method comprising installing a coupler on the outside of a domestic power cable that extends through a wall of a building, the coupler being configured to receive a signal bearing information and being further configured to launch, along the outside of the cable, a surface wave carrying said information, and interconnecting an output of a source of a signal bearing information to the coupler.

6. The method of claim 5 wherein the surface wave propagates in a Goubau propagation mode.

7. A method comprising installing a coupler on the outside of a domestic power cable that extends through a wall of a building from a first side of the wall to a second side of the wall, the coupler being installed on the second side of the wall and being configured to couple, from the domestic power cable, a surface wave propagating along the outside of the cable to the second side of the building wall.

8. The method of claim 7 wherein the surface wave has a Goubau propagation mode.

9. The method of claim 7 further comprising interconnecting the coupler with the input of a repeater node that is within the building.

10. The method of claim 9 wherein the surface wave is information-bearing.

11. In combination, an electrical power cable comprising at least one phase conductor, at least one ground conductor, and a conductive shield surrounding the at least one phase conductor and the at least one ground conductor, the cable being of at least a size specified by the National Electrical Code for supplying 100 amperes of service to a breaker box inside a premises, a coupler installed on the cable, the coupler being configured to launch surface electromagnetic waves along a path of the cable.

12. The combination of claim 11 wherein the coupler is configured to launch surface electromagnetic waves in a Goubau propagation mode.

13. The combination of claim 12 wherein the coupler surrounds the at least one phase conductor, a portion of the coupler but less than all of the coupler also surrounding the shield, the coupler comprising at least first and second conductive layers that are insulated from one another, are insulated from the phase conductor and are insulated from the shield.

14. The combination of claim 13 wherein the first conductive layer surrounds the electrical power cable, an insulation layer surrounds the first conductive layer, and the second conductive layer surrounds the insulation layer.

15. The combination of claim 14 wherein the second conductive layer is connected to ground.

16. The combination of claim 11 wherein the electrical power cable extends a through an exterior wall of a building, and wherein the combination further comprises an electrical meter to which one end of the electrical power cable is connected at a first side of the wall, a circuit breaker panel to which another end of the electrical power cable is connected at a second side of the wall, a source of RF signals carrying data, said source being connected to the coupler, said RF signals being launched by said coupler as said surface electromagnetic waves, a repeater, a second coupler installed on the cable at the second side of the wall and connected to the repeater, the second coupler being configured to convert the surface electromagnetic waves into RF signals and to provide the RF signals to the repeater, the repeater being configured to broadcast the data carried by the RF signals.

* * * * *